US 6,254,124 B1

(12) United States Patent
Angermaier

(10) Patent No.: US 6,254,124 B1
(45) Date of Patent: Jul. 3, 2001

(54) METHOD FOR OPERATING A VEHICLE OCCUPANT RESTRAINT SYSTEM AND A DEVICE FOR CARRYING OUT THE METHOD

(75) Inventor: Lorenz Angermaier, Bockhorn (DE)

(73) Assignee: TRW Airbag Systems GmbH & Co. KG, Aschau/Inn (DE)

( * ) Notice: Subject to any disclaimer, the term of this patent is extended or adjusted under 35 U.S.C. 154(b) by 0 days.

(21) Appl. No.: 09/336,042

(22) Filed: Jun. 18, 1999

(30) Foreign Application Priority Data

Jun. 19, 1998 (DE) ............................................. 198 27 427

(51) Int. Cl.$^7$ ................................................. B60R 21/32
(52) U.S. Cl. ........................... 280/735; 280/741; 180/271
(58) Field of Search ................................... 280/735, 739, 280/736, 743.1, 743.2, 742, 728.1, 741; 180/271, 282

(56) References Cited

U.S. PATENT DOCUMENTS

| 4,021,057 | * | 5/1977 | Held et al. ............................. 280/735 |
| 4,243,248 | * | 1/1981 | Scholz et al. ......................... 280/735 |
| 5,071,160 | * | 12/1991 | White et al. ......................... 280/735 |
| 5,074,583 | * | 12/1991 | Fujita et al. ....................... 280/730.1 |
| 5,330,226 | * | 7/1994 | Gentry et al. ......................... 280/735 |
| 5,400,487 | * | 3/1995 | Gioutsos et al. ..................... 280/735 |
| 5,413,378 | * | 5/1995 | Steffens, Jr. et al. ................. 280/735 |
| 5,501,488 | * | 3/1996 | Saderholm et al. .................. 280/739 |
| 5,513,879 | * | 5/1996 | Patel et al. ............................ 280/739 |
| 5,564,743 | * | 10/1996 | Marchant ............................. 280/741 |
| 5,762,367 | * | 6/1998 | Wolanin ............................... 280/736 |
| 5,927,753 | * | 7/1999 | Faigle et al. .......................... 280/735 |
| 5,957,490 | * | 9/1999 | Sinnhuber ............................ 280/735 |
| 6,065,773 | * | 5/2000 | Klinger et al. ....................... 280/736 |

FOREIGN PATENT DOCUMENTS 297 08 380 U   10/1997   (DE) .
0901946        3/1999    (EP) .
9817508        4/1998    (WO) .

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

The invention relates to a method for operating a vehicle occupant restraint system in which, after igniting of the first stage of the gas generator, the second stage not necessary to achieve the desired restraining effect is ignited when through its igniting no further restraining effect can be produced on the occupant in the case of an accident. Thereby, it is ruled out that the non-ignited stage can ignite itself in an uncontrolled manner. Further the invention relates to a device for carrying out the invention.

16 Claims, 2 Drawing Sheets

METHOD FOR OPERATING A VEHICLE OCCUPANT RESTRAINT SYSTEM AND A DEVICE FOR CARRYING OUT THE METHOD

TECHNICAL FIELD

The invention relates to a method for operating a vehicle occupant restraint system.

Furthermore, the invention relates to a device for carrying out the method according to the invention.

BACKGROUND OF THE INVENTION

Multiple-stage gas generators with propellant charges which are able to be ignited independently of each other can generate different quantities of gas, coordinated with vehicle occupants or accident-specific parameters. If not all the propellant charges are ignited to achieve the optimum restraining effect, but only some of them, the outflowing hot gas, however, automatically heats the outer and inner walls, so that heat is passed on to the at least one non-ignited charge. Theoretically, this can lead to the self ignition of the non-ignited charge after a few minutes, due to the relatively slow transportation of heat. This involves dangers both for the occupant still situated in the vehicle, and also for rescue personnel.

Furthermore, a gas generator in which not all the stages are ignited represents a problem with regard to recycling/disposal. Generally it is not—at least not simply—possible to detect from the exterior, whether all the stages have been ignited, so that a recycling or a disposal of an activated gas generator will take an increased effort in terms of safety.

BRIEF SUMMARY OF THE INVENTION

The invention provides a method in which the above-mentioned dangers and problems can be largely ruled out. This is achieved according to the invention by a method for operating a vehicle occupant restraint system, with a gas bag, which has a range of action which is defined by its occupied space in an inflated state of the gas bag, and a multiple-stage gas generator, which has several individually ignitable propellant charges. In the case of an accident, in which not all the stages are ignited to achieve a desired restraining effect, the non-ignited stage/stages is/are ignited at such a moment when it/they substantially can no longer have a restraining effect on the occupant.

The invention accordingly makes provision that in any case the stages which are not yet ignited are activated, so that always all the charges will be ignited or all stages activated even if not all stages are to be activated, in order to obtain the desired restraining effect tailored with respect to the conditions of the crash. The ignition of the non-activated stages takes place, however, when these cannot represent any further danger to the occupant, i.e. when no or substantially no further restraining effect can be achieved by them.

Preferably the activation of the non-ignited stages takes place when the occupant is situated outside the range of action or substantially outside, i.e. at the outer portions of the gas bag. However, as very small occupants under certain circumstances sit very close to the restraint system, theoretically it can occur that for example a driver's gas bag in its inflated state touches the occupant even if the occupant has leant back completely. In this position of the occupant, a restraining effect can still be exerted by the gas bag, which, however, is not as large as in the case of an occupant with his upper body moved forward. For this reason it was previously defined that the activation of the stages which were not yet ignited is to take place when substantially no further restraining effect can be exerted on the occupant. Thus, it is possible to predetermine a certain risk of being injured (e.g. by predetermining a minimum distance of the head to the steering wheel or a point of time when the occupant is moving backwardly), wherein the non-ignited steps are activated upon falling below the predetermined risk. Preferably, however, the vehicle occupant restraint system is to be constructed and the method is to be operated such that on ignition of the not yet activated stages no restraining effect at all can be exerted on the occupant.

The invention further provides a device for carrying out the method according to the invention. The device comprises a gas bag, a multiple-stage gas generator which has several individually ignitable propellant charges, and a control unit, which controls the activation of the propellant charges.

According to a preferred embodiment, provision is made that the ignition of the non-ignited stage/stages takes place when the occupant, after having dived into the gas bag, is in a rearward movement, also known as rebound. The activation of the non-ignited stage/stages can take place after a predetermined time, e.g. between 80 and 150 ms, after the ignition of the stage/stages necessary to achieve the restraining effect. In about this time range the rearward displacement of the occupant takes place so that the gas bag, which is again inflated by the lately activated stage(s), does not act as restraint means.

Furthermore, the activation of the not yet ignited stages can also take place as a function of the actual position of the occupant, not only the assumed position. This is achieved by at least one sensor. This sensor detects when the occupant is again situated outside or almost outside the range of action of the gas bag after having dived into the gas bag. A control unit which is connected with the sensor activates the non-ignited stage/stages in response to a corresponding signal of the sensor.

DETAILED DESCRIPTION OF PREFERRED EMBODIMENTS

Figure 1:
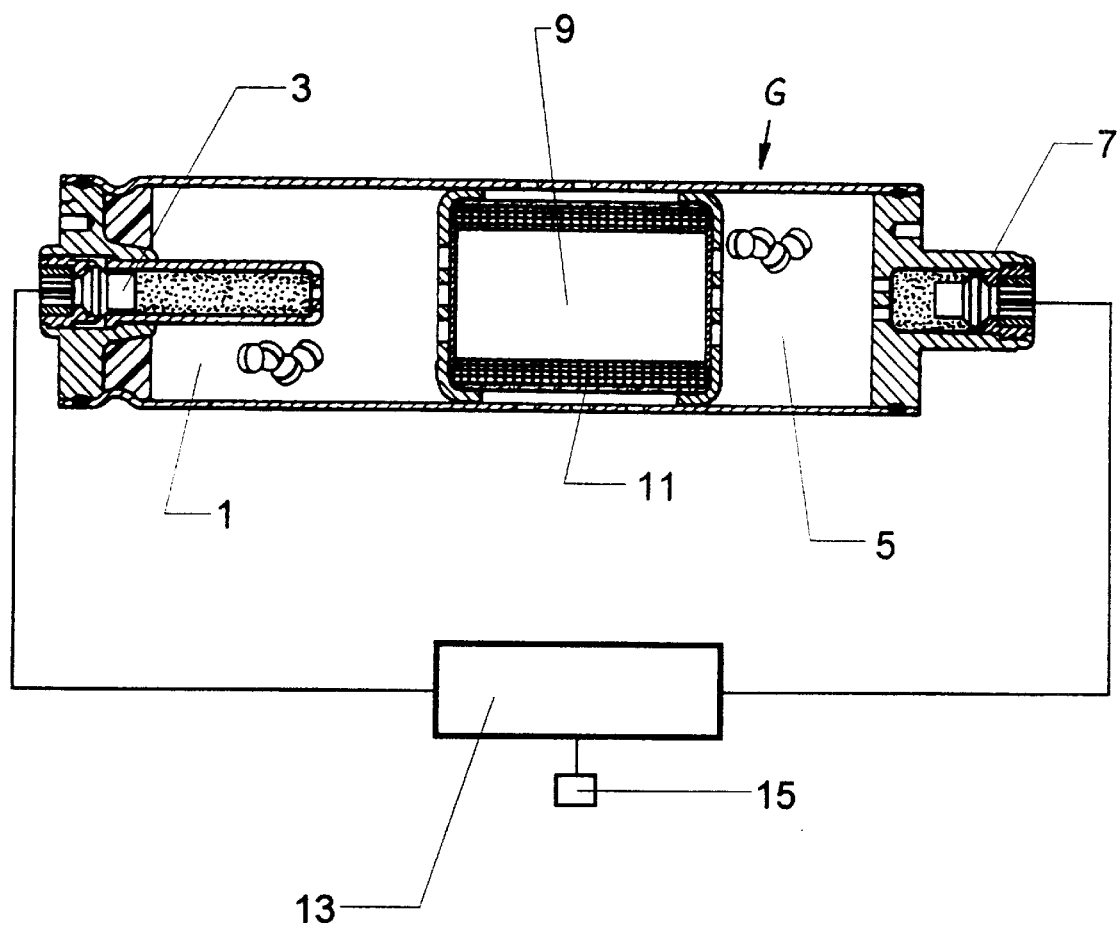
FIG. 1 shows a longitudinal section through a two-stage gas generator, which can be used in the method according to the invention and which defines a part of the device according to the invention shown in FIG. 2.

In FIG. 1 a two-stage gas generator G is shown, the first stage being defined by a pyrotechnic propellant charge 1 in a left-hand chamber and by an associated igniter 3, and the second stage being defined by a pyrotechnic propellant charge 5 in a right-hand chamber together with an associated igniter 7. On ignition of each stage, the generated gas flows into a chamber 9 and from there through a filter 11 into a passenger's gas bag 17 shown in FIG. 2. The igniters 3, 7 communicate with a control unit 13. In the case of restraint, this control unit activates one or both propellant charges 1, 5. The control unit 13 is connected with several sensors 15, shown in further detail in FIG. 2, which detect the position of the occupant's upper body.

Figure 2:
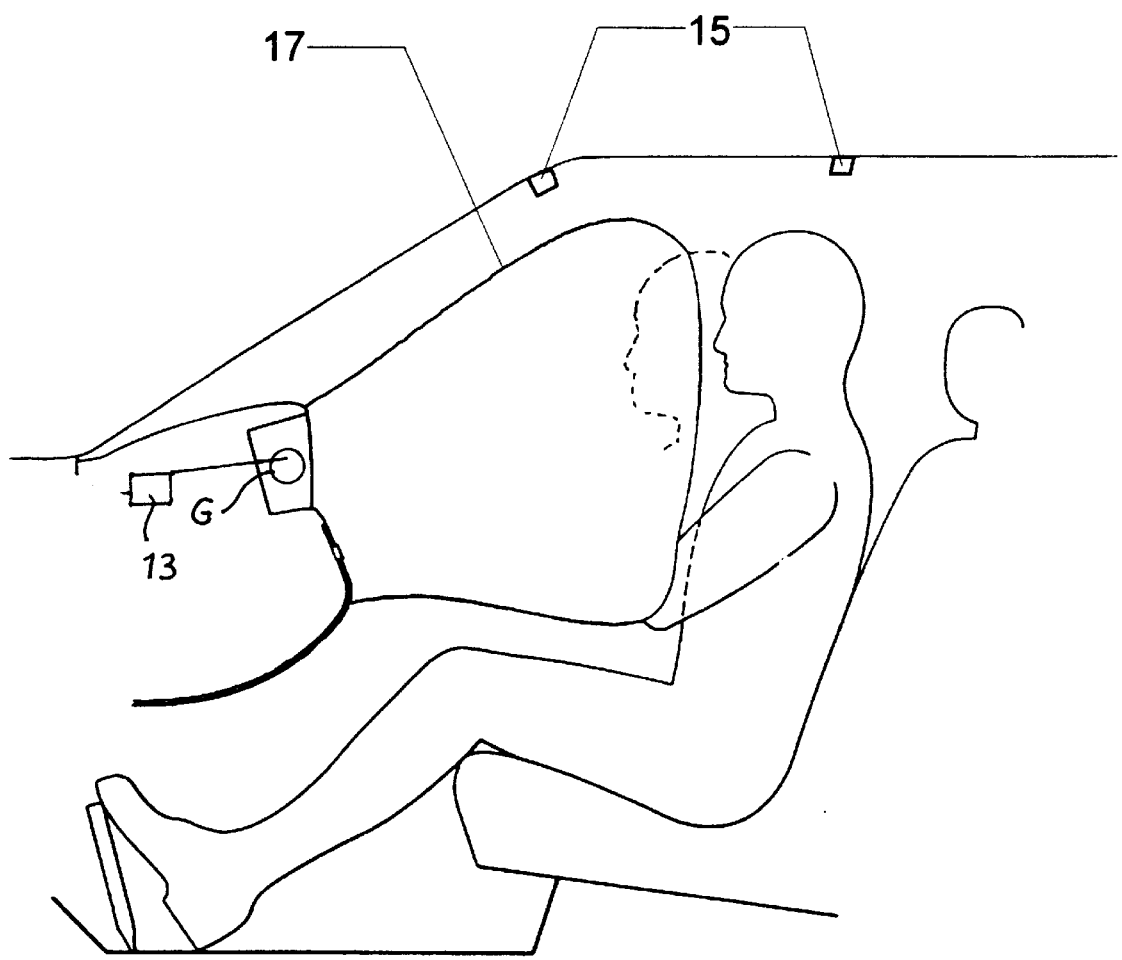
FIG. 2 shows a diagrammatic side view of a passenger and of the device according to the invention with the fully unfolded passenger's gas bag.

Depending on the severity of the accident and the position and constitution (weight, size) of the occupant, the propellant charge 1, the propellant charge 5 or both propellant charges 1 and 5 are ignited in the case of an accident. The gas bag 17 shown in FIG. 2 is unfolded by the generated gas and is inflated to a greater or lesser hardness. The gas bag 17 has a range of action which is defined by its space assumed in the inflated state, i.e. by the outer wall of the gas bag, as shown in FIG. 2.

If the above-mentioned parameters are such that only one stage, e.g. the propellant charge I, is ignited, in order to provide for a optimum, tailored restraint action, the gas bag 17 takes the form shown in FIG. 2. The forward movement of the occupant's upper body is limited by the inflated gas bag 17. The occupant dives into the gas bag 17. Then the upper body and the head move toward the rear again, then, depending on the accident (severity of accident, second crash), move forward again.

To prevent that the propellant charge 5 ignites itself due to the thermal diffusion occurring with the generation of gas after the ignition of the propellant charge 1, and that the occupant, who may want to free himself from the car, is prevented from being injured by the gas bag 17, which is then inflated once again, the propellant charge 5 is activated exactly at a time, when no restraining effect on the occupant can be produced by igniting this stage. To rule out the above-mentioned risk of injury to the occupant, the second stage is ignited as quickly as possible, namely immediately when the occupant is again situated outside the range of action of the gas bag 17 in the first rearward movement after having dived into the gas bag 17. Several sensors 15 arranged in the vehicle detect the position of the head and of the upper body of the occupant during the accident. The control unit 13 activates the second stage as soon as the occupant is outside the range of action of the gas bag 17.

According to a simpler solution, the sensors 15 can also be omitted. The device according to this embodiment has the identical design as the embodiment shown in FIG. 2, wherein only sensors 15 are omitted. Then, after a time interval which is previously determined depending on the vehicle occupant restraint system (gas bag, e.g. its volume; gas generator, e.g. gas emission velocity; control unit, e.g. operation time), the second stage is ignited after activation of the first stage. This time interval preferably amounts to approximately 100 ms. It is possible to predict with acceptable certainty that the occupant already moves backwardly at this point of time. Even if the occupant is at the outer portion of the range of gas bag action as depicted by a head shown with broken lines, the impact of the gas bag by contacting the head is low as the gas bag and the head move in the same direction and as the expansion velocity of the gas bag noticeably decreases at the end of the inflation process. Here, the head is located in a position substantially outside the range of gas bag action.

What is claimed is:

1. A method of operating a vehicle occupant restraint system which comprises a gas bag having a deflated condition and an inflated condition and a multiple stage gas generator having a plurality of individually ignitable propellant charges, said method comprising the steps of:

sensing a vehicle crash;

igniting at least one of said propellant charges and not igniting any remaining propellant charge;

inflating the gas bag;

restraining the vehicle occupant with the inflated gas bag;

after restraining the vehicle occupant with the inflated gas bag, sensing the position of the vehicle occupant; and igniting any remaining non-ignited propellant charge when the vehicle occupant is located spaced apart from the gas bag so that the gas bag has no restraining effect on the vehicle occupant due to ignition of any remaining propellant charge.

2. The method according to claim 1 wherein the vehicle occupant restraint system further comprises at least one sensor for sensing the position of the vehicle occupant located spaced apart from the gas bag after the vehicle occupant has been restrained and further including the step of activating a control unit for igniting any remaining non-ignited propellant charge in response to the sensor sensing the location of the vehicle occupant spaced apart from the inflated gas bag.

3. A vehicle occupant restraint system comprising;

a gas bag having a deflated condition and an inflated condition, a multiple stage gas generator having a plurality of individually ignitable propellant charges, and a control unit for controlling the ignition of said propellant charges, said control unit igniting at least one of said propellant charges and not igniting any remaining propellant charge in response to the occurrence of a vehicle crash, said at least one ignited propellant charge inflating said gas bag to said inflated condition to restrain said vehicle occupant, said control unit igniting said any remaining non-ignited propellant charge when the position of the vehicle occupant is spaced apart from the gas bag so that the gas bag has no restraining effect on the vehicle occupant due to ignition of any remaining propellant charge.

4. The system according to claim 3 further comprising at least one sensor connected to said control unit for sensing the position of the vehicle occupant within the vehicle after igniting said at least one ignitable propellant charge.

5. The system according to claim 3 further comprising a plurality of sensors mounted in the interior of a vehicle for sensing the position of one of the head or the upper body of the vehicle occupant.

6. A method of operating a vehicle occupant restraint system which comprises a gas bag having a deflated condition and an inflated condition and a multiple stage gas generator having a plurality of individually ignitable propellant charges, said method comprising the steps of:

sensing a vehicle crash;

igniting at least one of said propellant charges and not igniting any remaining propellant charge;

inflating the gas bag;

restraining the vehicle occupant with the inflated gas bag;

after restraining the vehicle occupant with the inflated gas bag, igniting any remaining non-ignited propellant charge at a predetermined time delay after ignition of the at-least one propellant charge and when the vehicle occupant is located spaced apart from the gas bag so that the gas bag has no restraining effect on the vehicle occupant due to ignition of any remaining propellant charge.

7. The method according to claim 6 wherein said predetermined time delay is between 80 and 150 milliseconds.

8. The method according to claim 6 wherein the vehicle occupant restraint system further comprises at least one sensor for sensing the position of the vehicle occupant located spaced apart from the gas bag after the vehicle occupant has been restrained; and further including the step of activating a control unit for igniting any remaining non-ignited charge in response to the sensor sensing the location of the vehicle occupant spaced apart from the inflated gas bag.

9. A vehicle occupant restraint system comprising:

a gas bag having a deflated condition and an inflated condition;

a multiple stage gas generator having a plurality of individually ignitable propellant charges; and a control unit for controlling ignition of said propellant charges, said control unit igniting at least one of said propellant charges and not igniting any remaining propellant charge in response to sensing a vehicle crash, said at least one ignited propellant charge inflating said gas bag to said inflated condition to restrain said vehicle occupant, said control unit igniting said any remaining non-ignited propellant charge at a predetermined time delay from ignition of said at least one propellant charge and when the vehicle occupant is located spaced apart from the inflated gas bag so the gas bag has no restraining effect on the vehicle occupant due to ignition of any remaining propellant charge.

10. The system according to claim 9 further comprising at least one sensor connected to said control unit for sensing the position of the vehicle occupant within the vehicle after igniting said at least one ignitable propellant charge.

11. The system according to claim 9 further comprising a plurality of sensors mounted in the interior of a vehicle for sensing the position of one of the head or the upper body of the vehicle occupant.

12. A method of operating a vehicle occupant restraint system which comprises a gas bag having a deflated condition and an inflated condition and a multiple stage gas generator having a plurality of individually ignitable propellant charges, said method comprising the steps of:

sensing a vehicle crash;

igniting at least one of said propellant charges and not igniting any remaining propellant charge;

inflating the gas bag;

restraining the vehicle occupant with the inflated gas bag;

after restraining the vehicle occupant with the inflated gas bag, detecting the rearward movement of the vehicle occupant and, igniting any remaining non-ignited propellant charge after detecting that the occupant is in a rearward movement.

13. The method according to claim 12 wherein the vehicle occupant restraint system further comprises at least one sensor for sensing the position of the vehicle occupant located spaced apart from the gas bag after the vehicle occupant has been restrained; and further including the step of activating a control unit for igniting any remaining non-ignited charge in response to the sensor sensing the location of the vehicle occupant spaced apart from the inflated gas bag.

14. A vehicle occupant restraint system comprising:

a gas bag having a deflated condition and an inflated condition;

a multiple stage gas generator having a plurality of individually ignitable propellant charges; and a control unit for controlling ignition of said propellant charges, said control unit igniting at least one of said propellant charges and not igniting any remaining propellant charge in response to sensing a vehicle crash, said at least one ignited propellant charge inflating said gas bag to said inflated condition to restrain said vehicle occupant, said control unit igniting said any remaining non-ignited propellant charge after detecting the rearward movement of the vehicle occupant.

15. The system according to claim 14 further comprising at least one sensor connected to said control unit for sensing the position of the vehicle occupant within the vehicle after igniting said at least one ignitable propellant charge.

16. The system according to claim 14 further comprising a plurality of sensors mounted in the interior of a vehicle for sensing the position of one of the head or the upper body of the vehicle occupant.

* * * * *